(12) United States Patent
Parr (10) Patent No.: US 12,291,061 B2
(45) Date of Patent: May 6, 2025

(54) NON-PNEUMATIC TIRE HAVING SIDEWALL COVERS

(71) Applicant: Bridgestone Americas Tire Operations, LLC, Nashville, TN (US)

(72) Inventor: Richard S. Parr, Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 415 days.

(21) Appl. No.: 17/783,794

(22) PCT Filed: Nov. 16, 2020

(86) PCT No.: PCT/US2020/060733
§ 371 (c)(1),
(2) Date: Jun. 9, 2022

(87) PCT Pub. No.: WO2021/137957
PCT Pub. Date: Jul. 8, 2021

(65) Prior Publication Data
US 2023/0009226 A1    Jan. 12, 2023

Related U.S. Application Data

(60) Provisional application No. 62/954,756, filed on Dec. 30, 2019.

(51) Int. Cl.
*B60C 7/14* (2006.01)
*B60B 9/26* (2006.01)
(Continued)

(52) U.S. Cl.
CPC ............... *B60C 7/143* (2013.01); *B60B 9/26* (2013.01); *B60C 7/107* (2021.08); *B60C 7/125* (2013.01); *B60C 7/146* (2021.08)

(58) Field of Classification Search
CPC ........... B60C 7/146; B60C 7/22; B60C 7/107; B60C 7/12; B60C 7/125; B60B 7/01; B60B 7/068; B60B 7/04; B60B 9/26
See application file for complete search history.

(56) References Cited

U.S. PATENT DOCUMENTS 1,424,223 A    8/1922   Wagner
4,709,967 A    12/1987  Sakamoto et al.
(Continued)

FOREIGN PATENT DOCUMENTS

DE    4301778 A1    7/1994
JP    06-036901     5/1994
(Continued)

OTHER PUBLICATIONS

International Search Report & Written Opinion; Corresponding PCT Application Serial No. PCT/US2020/060733; Authorized Officer Bahng, Seung Hoon; Mar. 2, 2021.
(Continued)

*Primary Examiner* — Jason R Bellinger
(74) *Attorney, Agent, or Firm* — Shaun J. Fox; Bryan J. Jaketic (57) ABSTRACT

A non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring. The non-pneumatic tire also includes an upper sidewall having an annulus shape that covers a portion of a first side of the support structure. The upper sidewall has an inner diameter that is greater than the first diameter.

20 Claims, 11 Drawing Sheets

(51) Int. Cl.
*B60C 7/10* (2006.01)
*B60C 7/12* (2006.01)

(56) References Cited

U.S. PATENT DOCUMENTS

| | | | | |
|---|---|---|---|---|
| 4,945,962 | A * | 8/1990 | Pajtas | B60C 7/107 |
| | | | | 152/7 |
| 5,372,406 | A * | 12/1994 | Ohtsuka | B60B 7/01 |
| | | | | 301/37.23 |
| 6,286,572 | B1 * | 9/2001 | Chen | B60D 1/52 |
| | | | | 152/84 |
| 8,555,941 | B2 * | 10/2013 | Perron | B29D 30/02 |
| | | | | 301/37.23 |
| 10,434,819 | B2 * | 10/2019 | Renson | B60B 7/0026 |
| 10,749,242 | B2 * | 8/2020 | Fenkanyn | H01Q 1/2241 |
| 11,021,010 | B2 * | 6/2021 | Nylund | B60B 7/01 |
| 2012/0038207 | A1 | 2/2012 | Williams et al. | |
| 2015/0122382 | A1 | 5/2015 | Choi et al. | |
| 2015/0298498 | A1 | 10/2015 | Seradarian et al. | |
| 2015/0298499 | A1 | 10/2015 | Renson et al. | |
| 2021/0155035 | A1 * | 5/2021 | Nylund | B60B 7/01 |

FOREIGN PATENT DOCUMENTS

| | | |
|---|---|---|
| KR | 20140028473 | 3/2014 |
| WO | 2006037353 | 4/2006 |

OTHER PUBLICATIONS

European Search Report; Corresponding EP Application Serial No. 20910056.9; Dec. 20, 2023.

* cited by examiner

NON-PNEUMATIC TIRE HAVING SIDEWALL COVERS

CROSS-REFERENCE TO RELATED APPLICATIONS

This application is a national stage application, filed under 35 U.S.C. § 371, of International Patent Application No. PCT/US2020/060733, filed on Nov. 16, 2020, which in turn claims priority to U.S. Provisional Patent Application No. 62/954,756, filed on Dec. 30, 2019. Both of these documents are incorporated by reference herein in their entirety.

FIELD OF INVENTION

The present disclosure relates to a non-pneumatic tire having sidewalls. More particularly, the present disclosure relates to a non-pneumatic tire having two-piece sidewall covers.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects a lower ring to an upper ring.

SUMMARY OF THE INVENTION

In one embodiment, a non-pneumatic tire, rim, and sidewall assembly is provided. The assembly includes a non-pneumatic tire having a lower ring with a first diameter, and an upper ring with a second diameter greater than the first diameter. The upper ring is substantially coaxial with the lower ring. The non-pneumatic tire further includes support structure extending between the lower ring and the upper ring. The assembly further includes a rim connected to the lower ring of the non-pneumatic tire. The assembly also has a lower sidewall cover connected to the rim. The lower sidewall cover includes an annulus portion that covers a first side of the lower ring and a portion of a first side of the support structure. The annulus portion of the lower sidewall cover has an inner diameter that is less than the first diameter. The annulus portion of the lower sidewall cover has an outer diameter that is less than the second diameter. The assembly also includes an upper sidewall cover having an annulus shape that covers a portion of the first side of the support structure. The upper sidewall cover has an inner diameter that is less than the outer diameter of the annulus portion of the lower sidewall cover.

In another embodiment, a method of covering a side of a non-pneumatic tire is provided. The method includes providing a non-pneumatic tire having a lower ring with a first diameter, an upper ring with a second diameter greater than the first diameter, and support structure extending between the lower ring and the upper ring. The upper ring is substantially coaxial with the lower ring. The method further includes providing a rim and mounting the non-pneumatic tire on the rim. The method also includes providing a lower sidewall having an annulus portion and connecting the lower sidewall to the rim such that the annulus portion of the lower sidewall covers a first side of the lower ring and a lower portion of a first side of the support structure, and such that the lower sidewall does not cover an upper portion of the first side of the support structure.

In yet another embodiment, a non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring. The non-pneumatic tire also includes an upper sidewall having an annulus shape that covers a portion of a first side of the support structure. The upper sidewall has an inner diameter that is greater than the first diameter.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
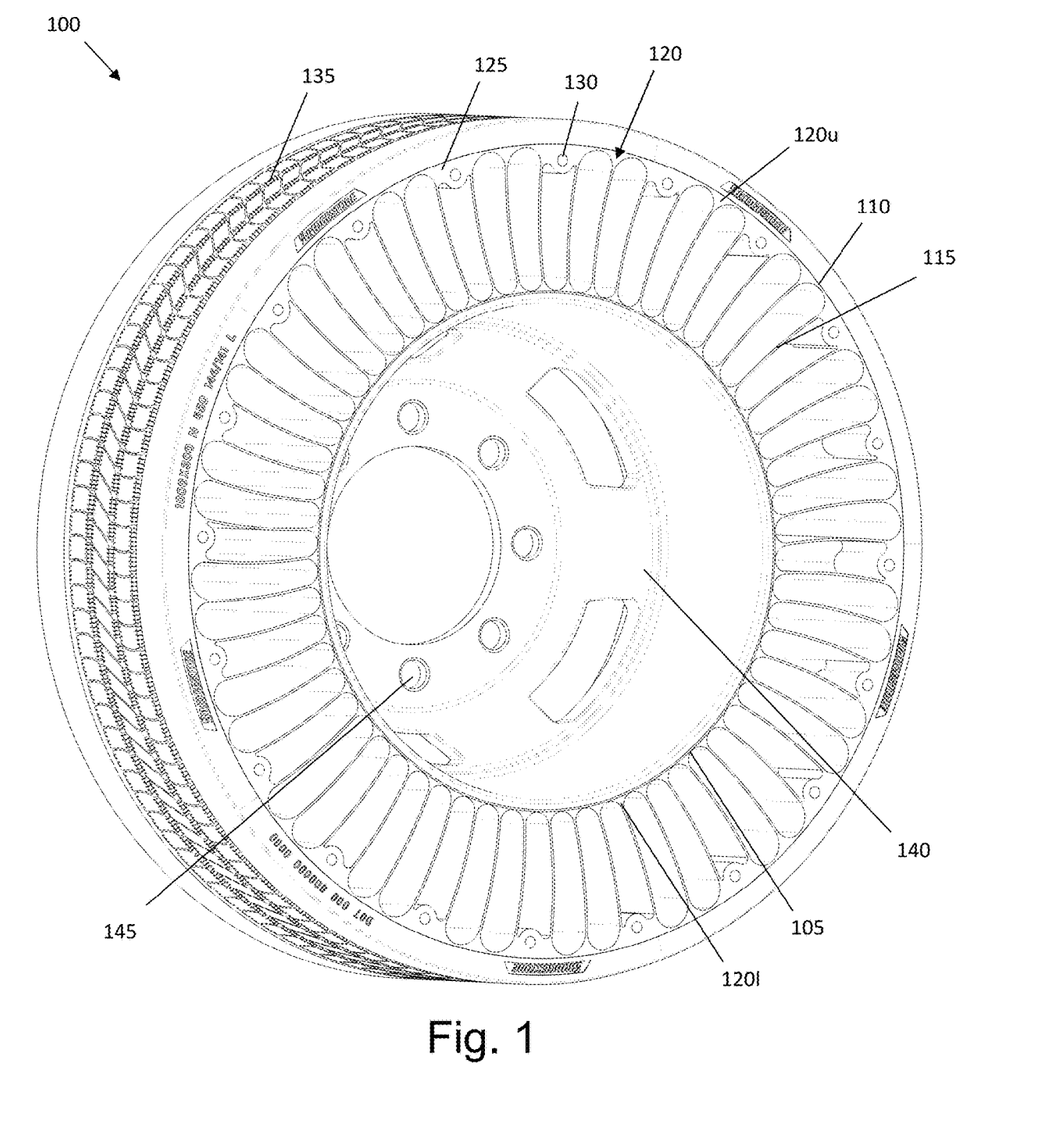
FIG. 1 is a perspective view of one embodiment of a non-pneumatic tire and rim assembly.

FIG. 1 is a partial perspective view of one embodiment of a non-pneumatic tire and rim assembly. The assembly includes a non-pneumatic tire 100 having a lower ring 105 with a first diameter, and an upper ring 110 having a second diameter greater than the first diameter. The upper ring 110 is substantially coaxial with the lower ring 105. A plurality of spokes 115 extend between the lower ring 105 and the upper ring 110.

A plurality of fillets 120 are disposed between the lower ring 105 and the upper ring 110 at the end of each spoke 115. The plurality of fillets 120 includes lower fillets $120_l$ and upper fillets $120_u$. The lower fillets $120_l$ are in direct contact with the lower ring 105. The upper fillets $120_u$ are in direct contact with the upper ring 110. In an alternative embodiment, the fillets may be omitted.

A plurality of ears 125 are disposed between pairs of adjacent spokes 115. Each ear 125 includes an aperture 130. The aperture 130 may be a threaded aperture or a smooth aperture. In an alternative embodiment, the ears may be omitted.

In an alternative embodiment, a webbing or other support structure may be employed instead of spokes.

A circumferential tread 135 is disposed about the upper ring 110 in the illustrated embodiment. The tread 135 may include tread elements such as grooves, ribs, blocks, lugs, sipes, studs, and other elements. A shear band or other shear element or reinforcement structure (not shown) may be disposed between the upper ring 110 and the tread 135. In an alternative embodiment (not shown), the separate tread may be omitted and instead tread elements may be formed directly on the upper ring.

The lower and upper rings 105, 110 may be constructed of a polymeric material, such as natural or synthetic rubber, other elastomeric material. Alternatively, the lower and upper rings 105, 110 may be constructed of a harder polymeric material such as polyurethane, polyester, nylon or polyvinyl chloride (PVC). The spokes 115 may be constructed of elastomeric material having a single layer of reinforcement disposed therein. The tread 135, fillets 120, and ears 125 may be constructed of an elastomeric material, such as natural or synthetic rubber, or other elastomeric material.

The assembly further includes a wheel 140. The lower ring 105 is attached to the wheel 140, such as by an adhesive or through a chemical bonding process. The wheel 140 may be attached to a vehicle through a plurality of bolts (not shown) that extend through apertures 145.

Figure 2:
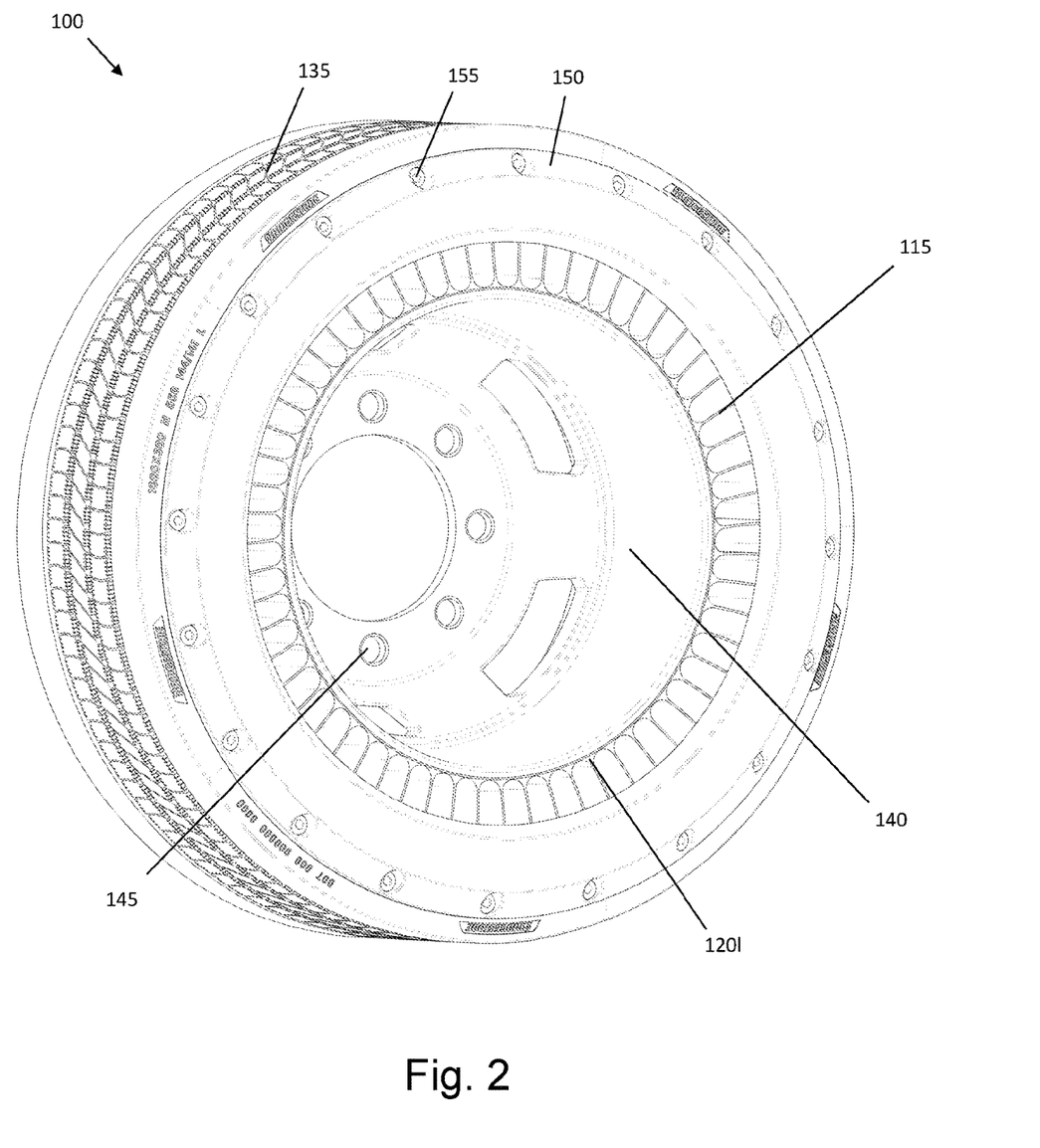
FIG. 2 is a perspective view of the non-pneumatic tire and rim assembly having an upper sidewall cover.

FIG. 2 is a perspective view of the non-pneumatic tire and rim assembly having an upper sidewall cover 150. The upper sidewall cover 150 may also be simply referred to as the upper sidewall or the upper cover. The upper sidewall cover 150 has an annulus shape that covers a portion of a first side of the non-pneumatic tire 100. Specifically, the upper sidewall cover 150 covers a portion of the spokes 115. The upper sidewall cover 150 has an inner diameter that is greater than the diameter of the lower ring 105. In the illustrated embodiment, the upper fillets $120_u$ and upper portions of the spokes 115 are covered by the upper sidewall cover 150, while the lower ring 105, the lower fillets $120_l$, and lower portions of the spokes 115 are uncovered.

In one embodiment, the upper ring 110 is covered by the upper sidewall cover 150. In other words, the outer diameter of the upper sidewall cover 150 is greater than the diameter of the upper ring 110. In an alternative embodiment, the upper ring 110 is uncovered. In other words, in such an embodiment the outer diameter of the upper sidewall cover 150 is less than the diameter of the upper ring 110. Similarly, in one embodiment, a shoulder region of the tread 135 is covered by the sidewall cover 150, while in an alternative embodiment, the shoulder region of the tread 135 is uncovered.

In the illustrated embodiment, the upper sidewall cover 150 is directly attached to the non-pneumatic tire 100 at a plurality of locations. Specifically, the upper sidewall cover 150 is bolted to the non-pneumatic tire 100 with bolts 155 extending into the apertures 130 of the ears 125. Thus, the upper sidewall cover 150 is removeably attached to the non-pneumatic tire 100. In alternative embodiments, other removable fasteners such as clips may be employed. In another alternative embodiment, the upper sidewall cover may be permanently attached to the non-pneumatic tire by adhesive or permanent fasteners.

While the illustrated embodiment shows the upper sidewall cover 150 as being attached to the ears 125 of the non-pneumatic tire, it should be understood that the upper sidewall cover may be attached at other locations. For example, the upper sidewall cover may be attached to the tread, the upper ring, the upper fillets, or the spokes or other support structure.

Figure 3:
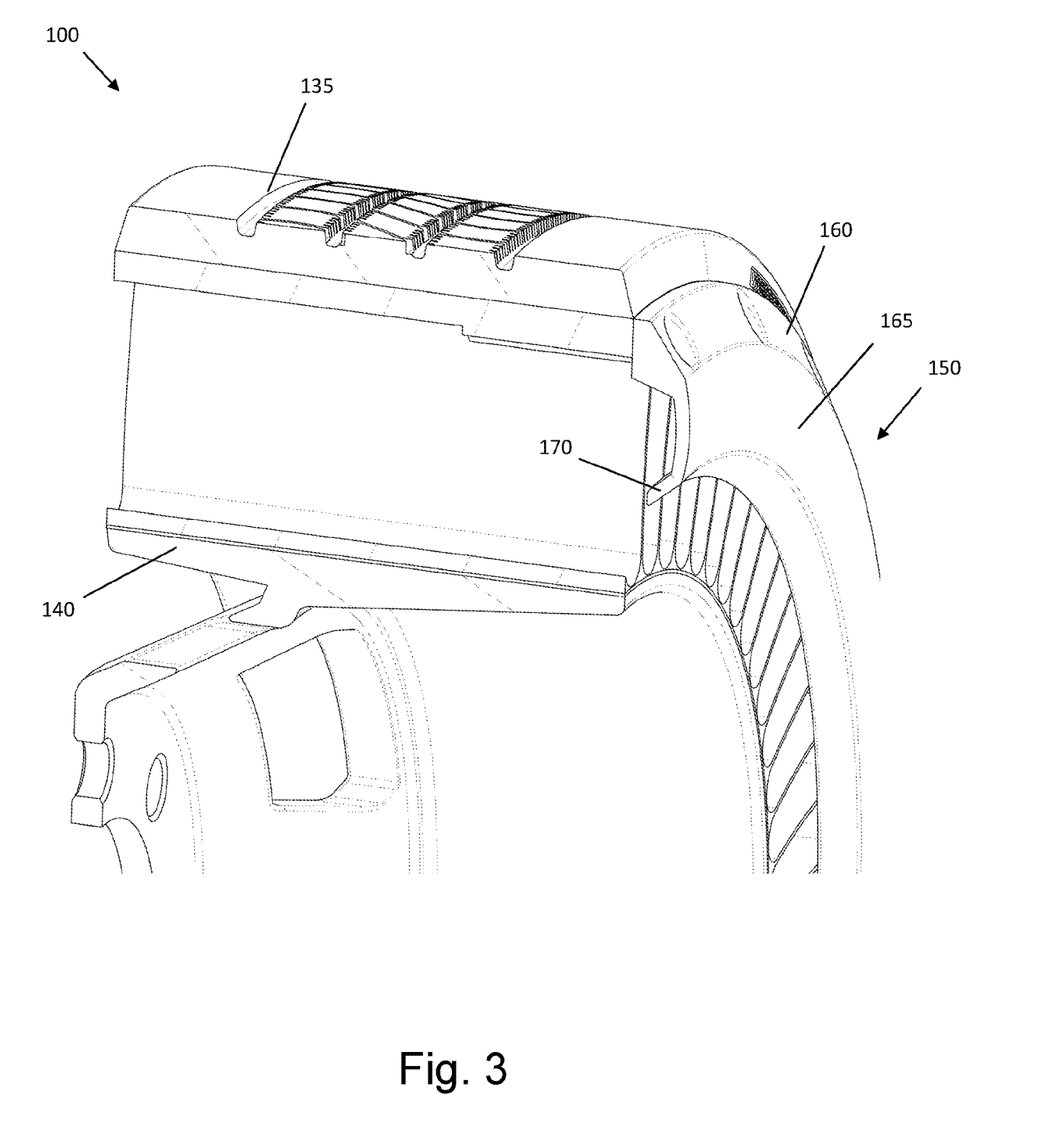
FIG. 3 is a partial cross-sectional view of the non-pneumatic tire and rim assembly having an upper sidewall cover as shown in FIG. 2.

FIG. 3 is a cross-sectional view of the assembly shown in FIG. 2. As can be seen from this view, the upper sidewall cover 150 includes an upper angled portion 160, a radial portion 165, and a lower angled portion 170. In other words, an upper portion of the upper sidewall cover 150 is bent inwards towards the non-pneumatic tire 100, and a lower portion of the upper sidewall cover 150 is likewise bent inwards towards the non-pneumatic tire 100. In an alternative embodiment, the angled lower portion is bent away from the non-pneumatic tire. In another alternative embodiment, the lower portion of the upper sidewall cover extends in a radial direction. In yet another alternative embodiment, the upper portion of the upper sidewall cover extends in a radial direction. In one such embodiment, the upper sidewall cover is a flat, disc-shaped component.

Figure 4:
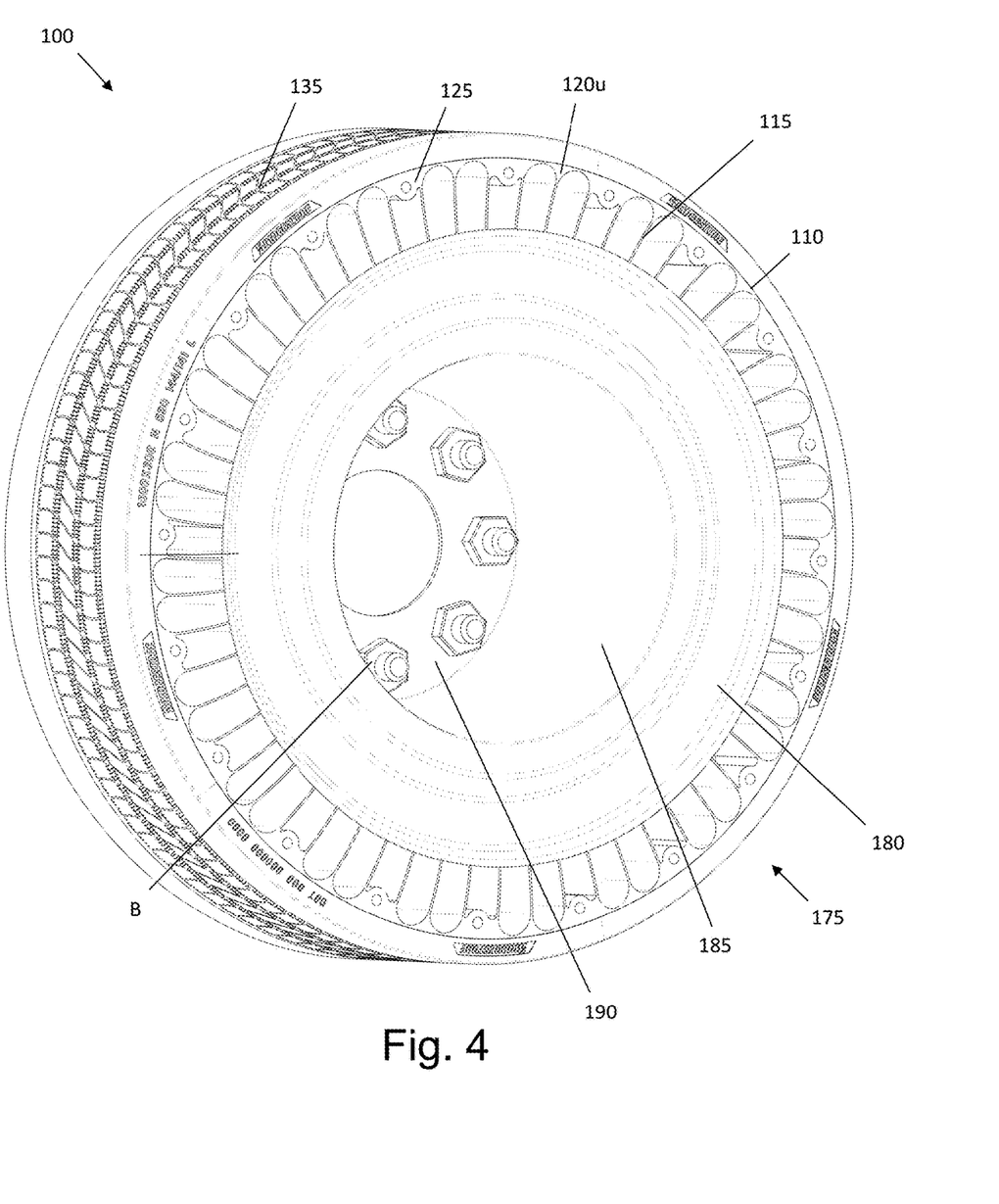
FIG. 4 is a perspective view of the non-pneumatic tire and rim assembly having a lower sidewall cover.

FIG. 4 is a partial perspective view of the non-pneumatic tire and rim assembly having a lower sidewall cover 175. The lower sidewall cover 175 may also be simply referred to as a lower sidewall or a lower cover. The lower sidewall cover 175 has an annulus portion 180 that covers a portion of a first side of the non-pneumatic tire 100. Specifically, the lower sidewall cover 175 includes an annulus portion 180 that covers a first side of the lower ring 105, the lower fillets $120_l$ and a lower portion of the spokes 115.

The annulus portion 180 of the lower sidewall cover 175 has an inner diameter that is less than the diameter of the inner ring 105, and an outer diameter that is less than the diameter of the outer ring 110. In the illustrated embodiment, the lower ring 105, the lower fillets $120_l$, and lower portions of the spokes 115 are covered by the annulus portion 180 of the lower sidewall cover 175, while the upper fillets $120_u$ and upper portions of the spokes 115 are uncovered.

The lower sidewall cover 175 also includes a cylinder 185 that has a diameter less than a diameter of the rim 135. The cylinder 185 thus can be received by the rim 135. The annulus portion 180 of the lower sidewall cover 175 extends radially outward from a first end of the cylinder 185. An annular wall 190 extends radially inward from a second end of the cylinder 185. The annular wall 190 includes a plurality of apertures (not shown) that align with bolts B that pass through apertures in the rim, thus allowing the annular wall 190 to be bolted to the wheel 140.

In the illustrated embodiment, the lower sidewall cover 175 is directly attached to the rim 135 at a plurality of locations. Thus, the lower sidewall cover 175 is removeably attached to the non-pneumatic tire and rim assembly. In alternative embodiments, other removable fasteners may be employed. In another alternative embodiment, the lower sidewall cover may be permanently attached to the non-pneumatic tire and rim assembly by adhesive or permanent fasteners.

While the illustrated embodiment shows the lower sidewall cover 175 as being attached to rim 135, it should be understood that the lower sidewall cover may be attached at other locations. For example, the lower sidewall cover may be attached to the lower ring, the lower fillets, or the spokes or other support structure.

Figure 5:
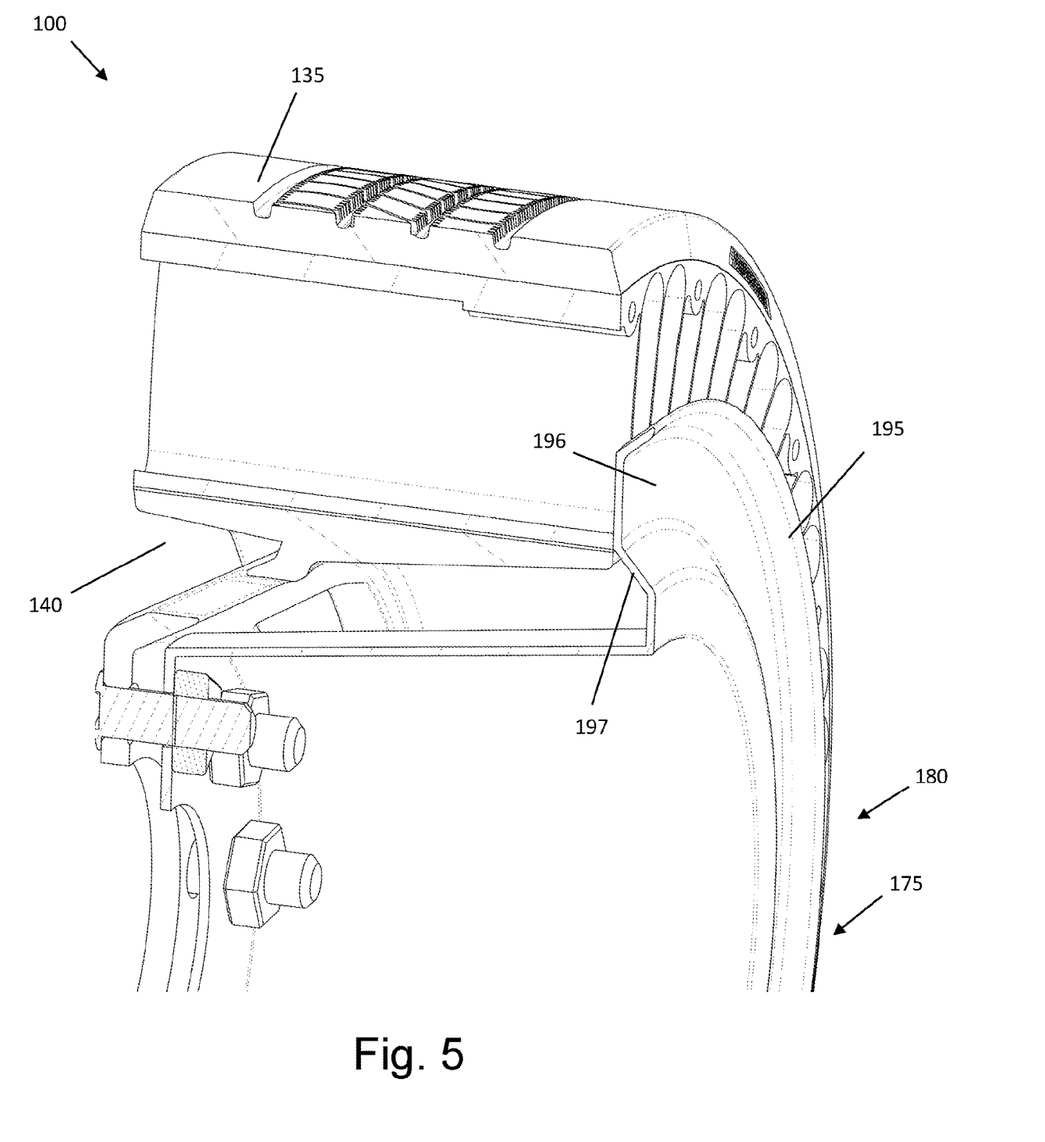
FIG. 5 is a partial cross-sectional view of the non-pneumatic tire and rim assembly having a lower sidewall cover as shown in FIG. 4.

FIG. 5 is a cross-sectional view of the assembly shown in FIG. 4. As can be seen from this view, the annulus portion 180 of the lower sidewall cover 175 includes an upper angled portion 195, a radial portion 196, and a lower angled portion 197. In other words, an upper portion of the lower sidewall cover 175 is bent outwards away from the non-pneumatic tire 100, and a lower portion of the lower sidewall cover 175 is also bent outwards away from the non-pneumatic tire 100. In an alternative embodiment, the angled upper portion is bent toward the non-pneumatic tire. In another alternative embodiment, the upper portion extends in a radial direction. In yet another alternative embodiment, the lower portion extends in a radial direction. In one such embodiment, the annulus portion of the lower sidewall cover is a flat, disc-shaped component.

Figure 6:
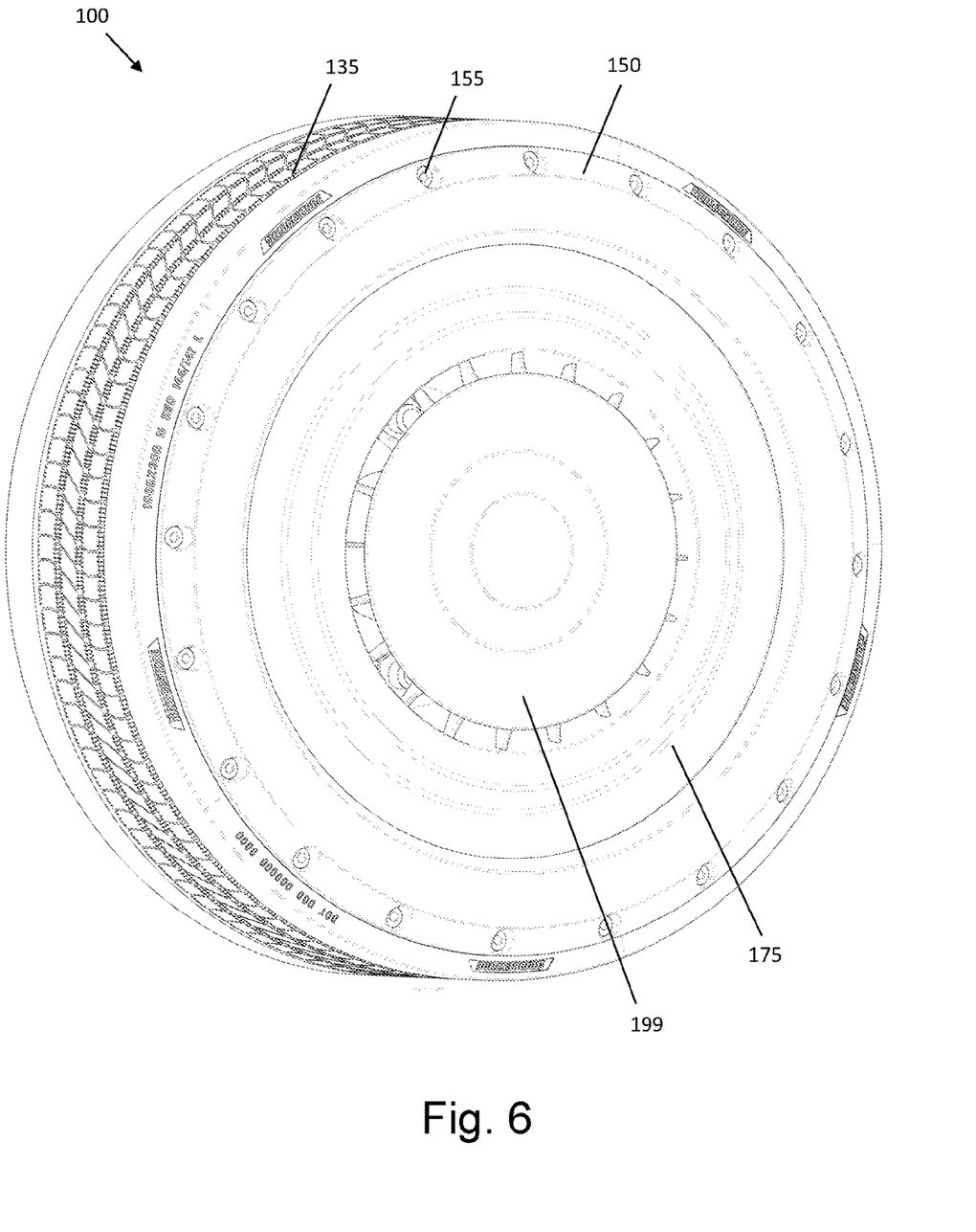
FIG. 6 is a perspective view of the non-pneumatic tire and rim assembly having an upper sidewall cover and a lower sidewall cover.

FIG. 6 is a perspective view of the non-pneumatic tire and rim assembly having both an upper sidewall cover 150 and a lower sidewall cover 175. While a user may employ only the upper sidewall cover, as shown in FIGS. 2 and 3, or only the lower sidewall cover 175 as shown in FIGS. 4 and 5, it may be desirable to employ both the upper sidewall cover 150 and the lower sidewall cover 175 as shown in FIG. 6. In the illustrated embodiment, a cap 199 is also attached to the lower sidewall cover 175 to cover the central opening. The cap 199 is optional.

Employing both the upper sidewall cover 150, the lower sidewall cover 175, and the optional cap 199 prevents debris from entering the openings in the non-pneumatic tire 100. Such debris could add weight to the tire and potentially damage the spokes 115 or other components. The upper sidewall cover 150, the lower sidewall cover 175, and the optional cap 199 can also protect the tire 100 from curb damage. The upper sidewall cover 150, the lower sidewall cover 175, and the optional cap 199 may also make the tire 100 more aerodynamic.

In the illustrated embodiment, the upper sidewall cover 150 is not directly attached to the lower sidewall cover 175. Thus, the two components may move radially (or float) with respect to each other. In one embodiment, the upper sidewall 150 is constructed of a semi-flexible material, such as plastic or rubber, while the lower sidewall 175 is constructed of a rigid material, such as metal, polyethylene, polypropylene, glass-filled plastic, or other plastic. Thus, the upper sidewall 150 (whether used alone or in combination with the lower sidewall 175) may flex if the spokes 115 buckle or flex during rotation. The lower sidewall 175 (whether used alone or in combination with the upper sidewall 150) may function as a "bump stop" and contact the tread 135 or a road surface if the tire 100 flexes beyond a predetermined amount.

Figure 7:
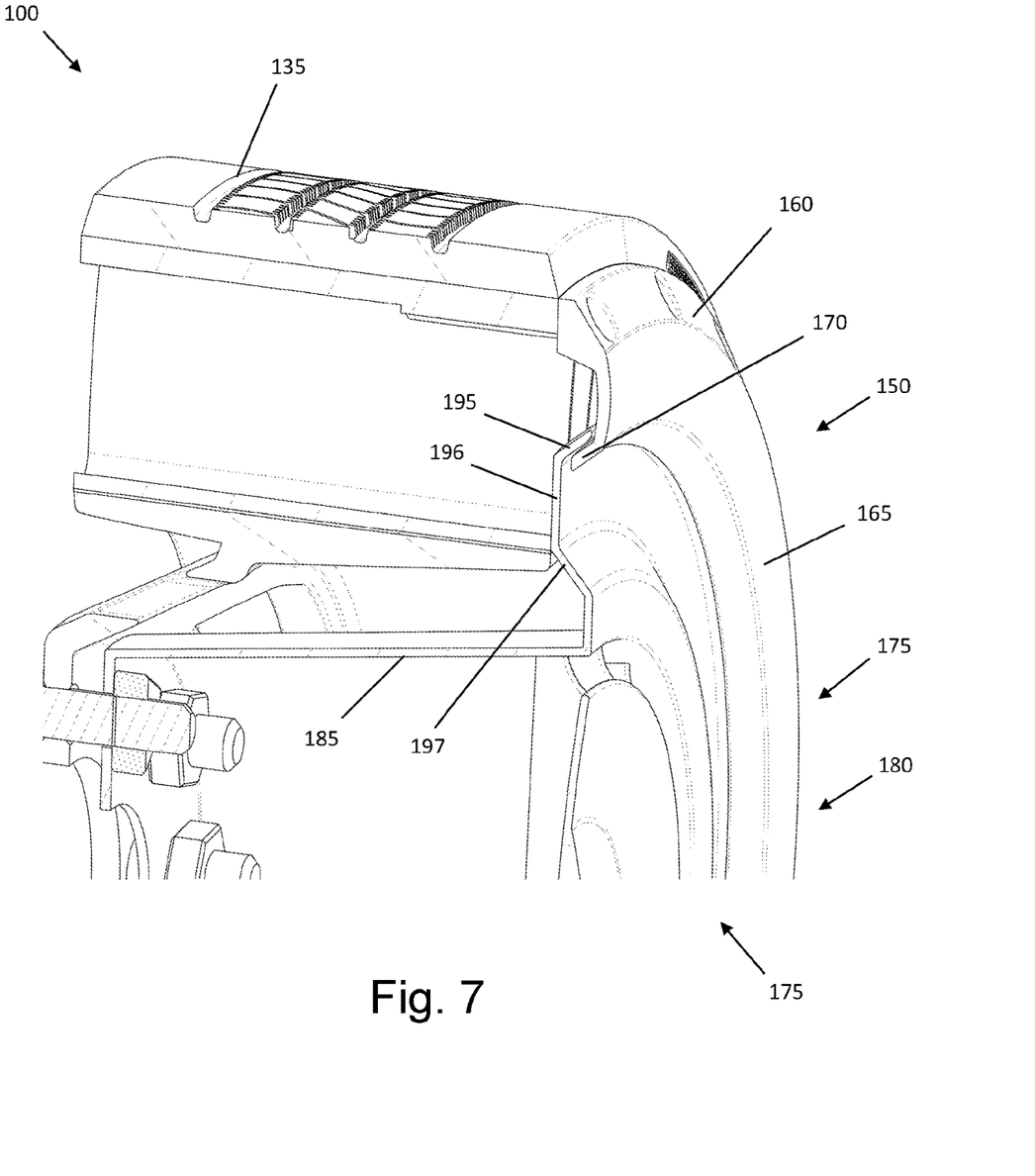
FIG. 7 is a partial cross-sectional view of the non-pneumatic tire and rim assembly having an upper sidewall cover and a lower sidewall cover as shown in FIG. 6.

FIG. 7 is a cross-sectional view of the non-pneumatic tire and rim assembly having an upper sidewall cover 150 and a lower sidewall cover 175 as shown in FIG. 6. As explained above with respect to FIG. 3, the upper sidewall cover 150 includes an upper angled portion 160, a radial portion 165, and a lower angled portion 170. In other words, an upper portion of the upper sidewall cover 150 is bent inwards towards the non-pneumatic tire 100, and a lower portion of the upper sidewall cover 150 is bent inwards towards the non-pneumatic tire 100. As further explained above with respect to FIG. 5, the annulus portion 180 of the lower sidewall cover 175 includes an upper angled portion 195, a radial portion 196, and a lower angled portion 197. In other words, an upper portion of the lower sidewall cover 175 is bent outwards away from the non-pneumatic tire 100, and a lower portion of the lower sidewall cover 175 is also bent outwards away from the non-pneumatic tire 100.

In the illustrated embodiment, the lower angled portion 170 of the upper sidewall cover 150 is radially below the upper angled portion 195 of the lower sidewall cover 175. The two angled portions thus form a labyrinthine, or torturous path, to further prevent debris from entering the openings of the tire 100.

In an alternative embodiment, the upper and lower sidewall covers could be bent in opposite directions. In other words, the angled upper portion of the lower sidewall cap may be bent toward the non-pneumatic tire, while the angled lower portion of the upper sidewall cap is bent away from the non-pneumatic tire. Such a configuration would still result in a labyrinthine, or torturous path.

In another alternative embodiment, the upper and lower sidewall covers simply overlap each other in a radial direction, without forming a labyrinthine or torturous path. Such a configuration may be easier to manufacture and assemble.

Figure 8:
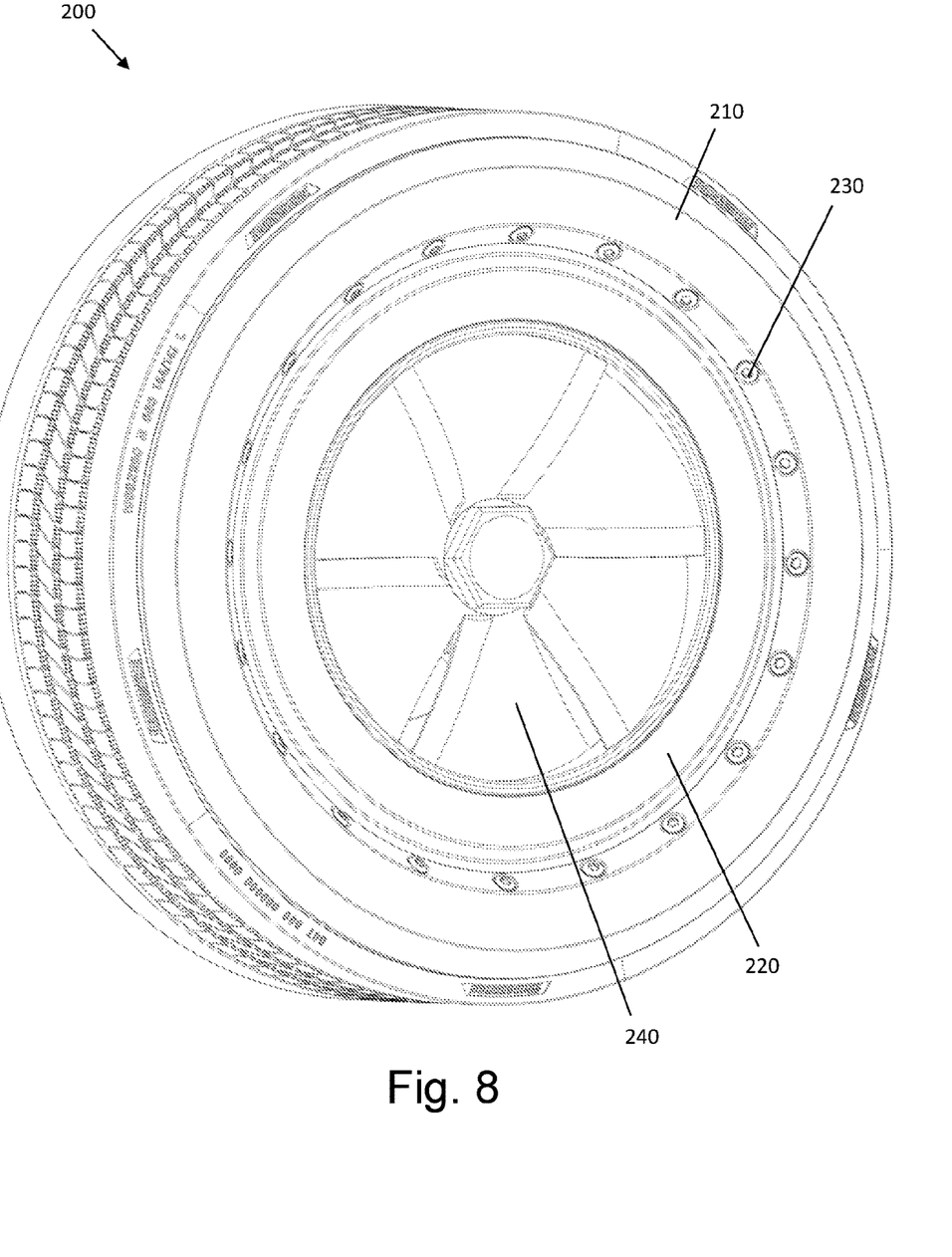
FIG. 8 is a perspective view of an alternative embodiment of a non-pneumatic tire and rim assembly having an upper sidewall cover and a lower sidewall cover.

FIG. 8 is a perspective view of an alternative embodiment of a non-pneumatic tire and rim assembly having an upper sidewall cover and a lower sidewall cover. In this embodiment, the non-pneumatic tire 200 may be substantially the same as the non-pneumatic tire 100, or any of the alternative embodiments described above. Thus, the non-pneumatic tire 200 is not described in further detail.

The non-pneumatic tire 200 includes an upper sidewall cover 210 and a lower sidewall cover 220. The upper and lower sidewall covers 210, 220 are substantially the same as the upper and lower sidewall covers 150, 175 described above except for the differences detailed herein.

In the illustrated embodiment, the lower sidewall cover 220 is directly attached to the upper sidewall cover 210 by a plurality of bolts 230. In an alternative embodiment, other temporary or permanent fasteners may be employed. In one embodiment, the upper sidewall cover 210 is not directly attached to the non-pneumatic tire 200. Instead, the upper sidewall cover 210 may move radially (or float) with respect to the non-pneumatic tire if the spokes of the tire buckle or flex.

The assembly also includes a cap 240 attached to the lower sidewall cover 220. In an alternative embodiment, the cap may be omitted.

Figure 9:
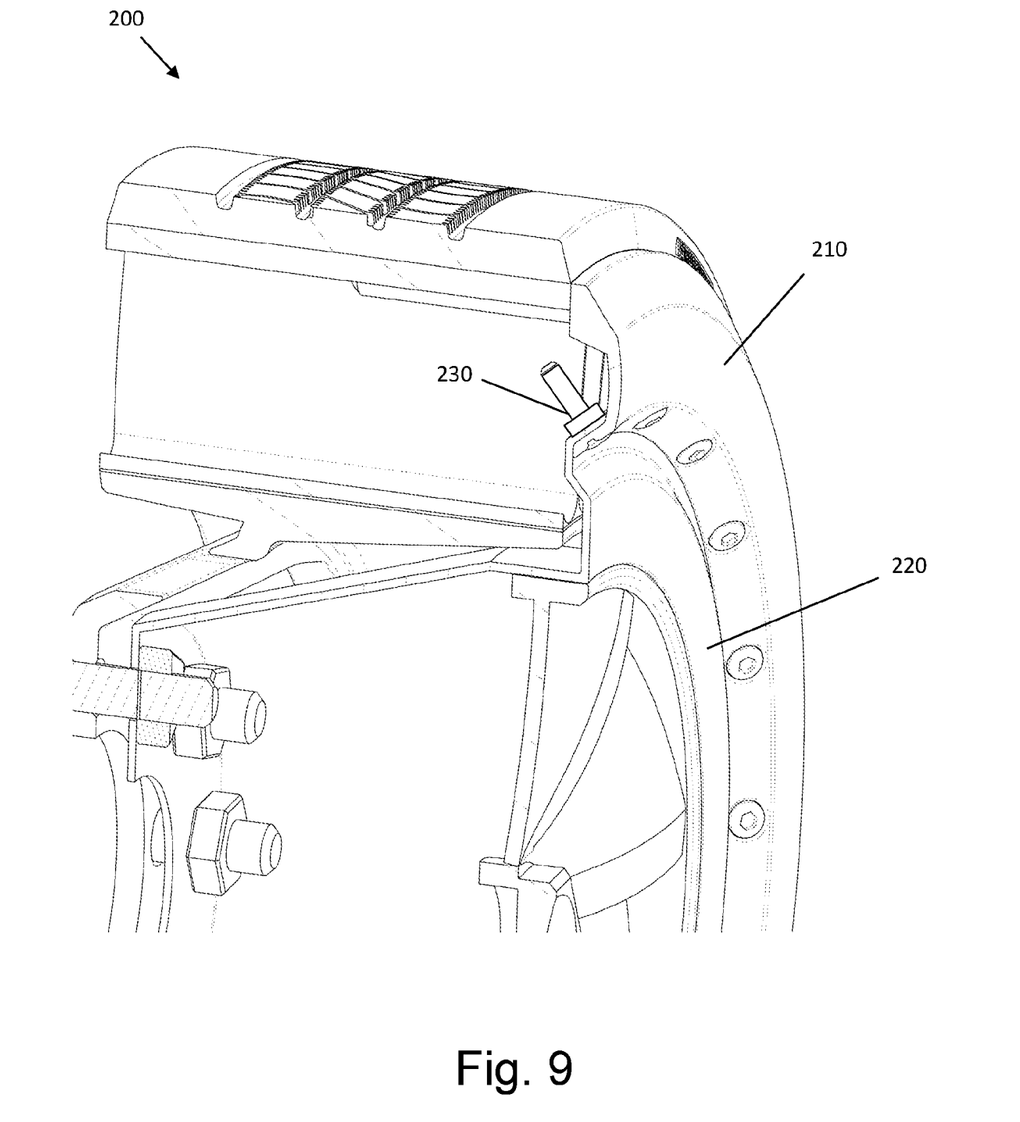
FIG. 9 is a cross-sectional view of the non-pneumatic tire and rim assembly having an upper sidewall cover and a lower sidewall cover as shown in FIG. 8.

FIG. 9 is a cross-sectional view of the non-pneumatic tire and rim assembly having an upper sidewall cover 210 and a lower sidewall cover 220 as shown in FIG. 8. As can be seen in this view, the upper and lower sidewall covers 210, 220 have the same bent configurations as the upper and lower sidewall covers 150, 175 shown in FIG. 6. It should be understood that the alternatives described with respect to FIG. 6 may also apply to the embodiment shown in FIG. 8.

Figure 10:
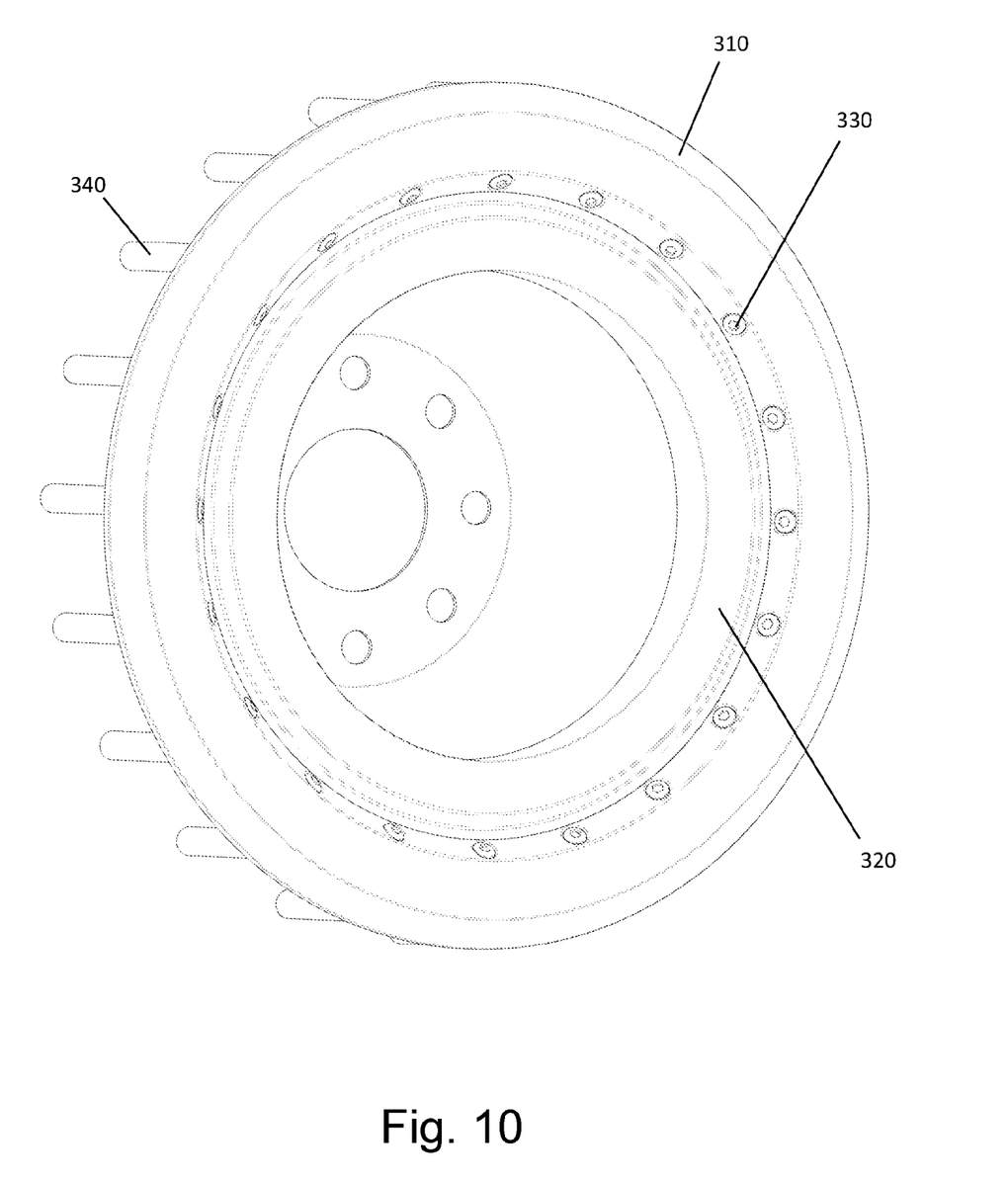
FIG. 10 is a perspective view of an alternative embodiment of an upper sidewall cover and the lower sidewall cover.
Figure 11:
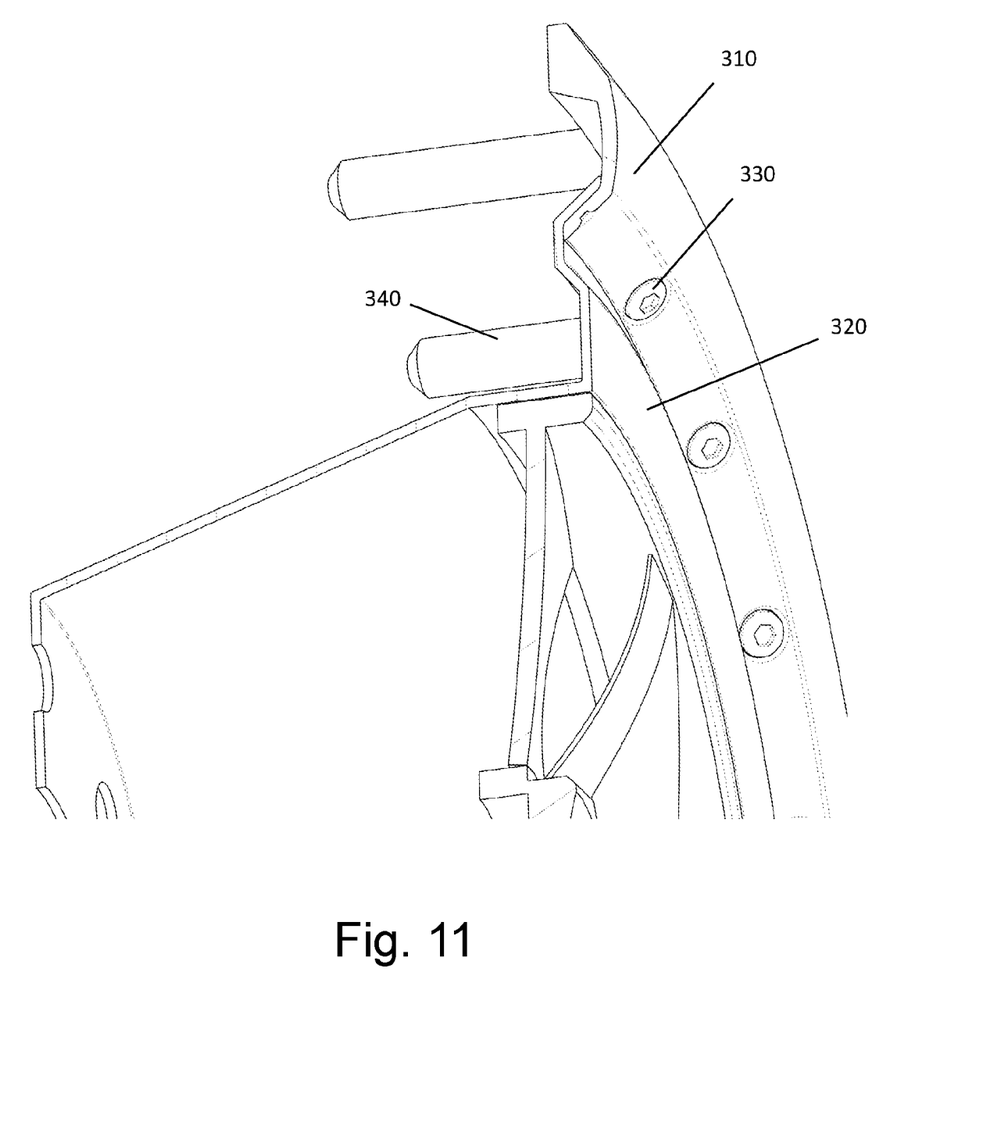
FIG. 11 is a cross-sectional view of the upper sidewall cover and the lower sidewall cover as shown in FIG. 10.

FIG. 10 is a perspective view of an alternative embodiment of an upper sidewall cover 310 and a lower sidewall cover 320. FIG. 11 is a cross-sectional view of the upper sidewall cover and the lower sidewall cover as shown in FIG. 10. As can be seen in these views, the upper sidewall cover 310 and lower sidewall cover 320 are directly attached to each other with a plurality of bolts 330. The upper and lower sidewall covers 310, 320 are substantially the same as the upper sidewall cover 210 and lower sidewall cover 220 described above with respect to FIGS. 8 and 9, except for the differences described herein.

In the illustrated embodiment, the upper sidewall cover 310 includes a plurality of projections 340 extending axially inward. The projections are dimensioned to fit in between the spokes of a non-pneumatic tire and may provide additional stability and prevent twisting. In one embodiment, the projections are dimensioned to provide a force fit attachment to the tire. The projections may have a textured surface or have features molded therein to increase the friction between the projections and spokes. While the projections 340 are shown as having a constant diameter, in an alternative embodiment the projections may be tapered. In an alternative embodiment, the projections have a smaller dimension such that there is a clearance between the projections and the spokes.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire, wheel rim, and sidewall assembly, the assembly comprising:
   a non-pneumatic tire including:
      a lower ring having a first diameter,
      an upper ring having a second diameter greater than the first diameter, the upper ring being substantially coaxial with the lower ring, and
      a support structure extending between the lower ring and the upper ring;
   a wheel rim connected to the lower ring of the non-pneumatic tire;
   a lower sidewall cover connected to the wheel rim, the lower sidewall cover including an annulus portion that covers a first side of the lower ring and a portion of a first side of the support structure,
      wherein the annulus portion of the lower sidewall cover has an inner diameter that is less than the first diameter, and
      wherein the annulus portion of the lower sidewall cover has an outer diameter that is less than the second diameter;
   an upper sidewall cover having an annulus shape that covers a portion of the first side of the support structure,
      wherein the upper sidewall cover has an inner diameter that is less than the outer diameter of the annulus portion of the lower sidewall cover.

2. The assembly of claim 1, wherein the upper sidewall cover is attached to the non-pneumatic tire at a plurality of locations.

3. The assembly of claim 2, wherein the upper sidewall cover is attached to the upper ring.

4. The assembly of claim 2, wherein the upper sidewall cover is attached to the support structure.

5. The assembly of claim 2, wherein the upper sidewall cover is not directly attached to the lower sidewall cover.

6. The assembly of claim 1, wherein the lower sidewall cover is attached to the upper sidewall cover.

7. The assembly of claim 6, wherein the upper sidewall cover is not directly attached to the non-pneumatic tire.

8. The assembly of claim 1, wherein a lower portion of the upper sidewall cover is bent inwards towards the non-pneumatic tire, and wherein an upper portion of the lower sidewall cover is bent outwards away from the non-pneumatic tire.

9. The assembly of claim 1, wherein a lower portion of the upper sidewall cover is bent away from the non-pneumatic tire, and wherein an upper portion of the lower sidewall cover is bent outwards inwards towards the non-pneumatic tire.

10. The assembly of claim 1, wherein the lower sidewall cover includes a cylinder, wherein the annulus portion of the lower sidewall cover extends radially outward from a first end of the cylinder, and wherein an annular wall extends radially inward from a second end of the cylinder, and wherein the annular wall is bolted to the rim.

11. A method of covering a side of a non-pneumatic tire, the method comprising:
providing a non-pneumatic tire including:
a lower ring having a first diameter,
an upper ring having a second diameter greater than the first diameter, the upper ring being substantially coaxial with the lower ring, and
a support structure extending between the lower ring and the upper ring;
providing a rim;
mounting the non-pneumatic tire on the rim;
providing a lower sidewall having an annulus portion; and
connecting the lower sidewall to the rim such that the annulus portion of the lower sidewall covers a first side of the lower ring and a lower portion of a first side of the support structure, and such that the lower sidewall does not cover an upper portion of the first side of the support structure;
wherein an upper portion of the lower sidewall cover is bent outwards away from the non-pneumatic tire.

12. The method of claim 11, further comprising:
providing an upper sidewall having an annulus shape, and attaching the upper sidewall to the non-pneumatic tire at a plurality of locations, without directly attaching the upper sidewall to the lower sidewall;
wherein a lower portion of the upper sidewall cover is bent inwards towards the non-pneumatic tire.

13. The method of claim 11, further comprising:
providing an upper sidewall having an annulus shape, and attaching the upper sidewall to the lower sidewall at a plurality of locations;
wherein a lower portion of the upper sidewall cover is bent inwards towards the non-pneumatic tire.

14. The method of claim 13, wherein the attaching of the upper sidewall to the lower sidewall at a plurality of locations includes inserting projections of the upper sidewall into openings between the support structure of the non-pneumatic tire.

15. The method of claim 11, wherein the connecting of the lower sidewall to the rim includes bolting the lower sidewall to the rim.

16. A non-pneumatic tire having a sidewall, the non-pneumatic tire comprising:
a lower ring having a first diameter;
an upper ring having a second diameter greater than the first diameter, the upper ring being substantially coaxial with the lower ring;
a support structure extending between the lower ring and the upper ring;
an upper sidewall having an annulus shape that covers a portion of a first side of the support structure, wherein the upper sidewall has an inner diameter that is greater than the first diameter,
wherein a lower portion of the of the upper sidewall is bent inwards towards the non-pneumatic tire.

17. The non-pneumatic tire of claim 16, wherein the upper sidewall has an outer diameter that is greater than the first diameter.

18. The non-pneumatic tire of claim 16, further comprising a lower sidewall having an annulus portion that covers a first side of the lower ring and a portion of a first side of the support structure, wherein the annulus portion of the lower sidewall cover has an inner diameter that is less than the first diameter, and wherein the annulus portion of the lower sidewall cover has an outer diameter that is less than the second diameter.

19. The non-pneumatic tire of claim 18, wherein the lower sidewall is attached to the upper sidewall.

20. The non-pneumatic tire of claim 16, wherein the support structure includes a plurality of spokes.

* * * * *